United States Patent
Winder

(10) Patent No.: US 9,767,598 B2
(45) Date of Patent: Sep. 19, 2017

(54) SMOOTHING AND ROBUST NORMAL ESTIMATION FOR 3D POINT CLOUDS

(75) Inventor: Simon A. J. Winder, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 934 days.

(21) Appl. No.: 13/566,796

(22) Filed: Aug. 3, 2012

(65) Prior Publication Data

US 2013/0321393 A1 Dec. 5, 2013

Related U.S. Application Data

(60) Provisional application No. 61/653,983, filed on May 31, 2012.

(51) Int. Cl.
| | |
|---|---|
| G09G 5/00 | (2006.01) |
| G06T 19/00 | (2011.01) |
| G06T 15/04 | (2011.01) |
| G06T 17/00 | (2006.01) |
| H04N 7/14 | (2006.01) |
| H04N 13/02 | (2006.01) |
| G06T 15/08 | (2011.01) |
| G06T 15/20 | (2011.01) |
| H04N 7/15 | (2006.01) |
| H04N 13/00 | (2006.01) |

(52) U.S. Cl.
CPC .............. *G06T 15/04* (2013.01); *G06T 15/08* (2013.01); *G06T 15/205* (2013.01); *G06T 17/00* (2013.01); *H04N 7/142* (2013.01); *H04N 7/15* (2013.01); *H04N 13/0014* (2013.01); *H04N 13/0239* (2013.01); *H04N 13/0257* (2013.01); *G06T 2210/56* (2013.01); *H04R 2227/005* (2013.01)

(58) Field of Classification Search
CPC ...... G06T 19/00; G06T 11/203; G06F 3/0485
USPC .......................................... 345/419, 611, 687
See application file for complete search history.

(56) References Cited

U.S. PATENT DOCUMENTS

| | | | |
|---|---|---|---|
| 5,850,352 A | 12/1998 | Moezzi et al. | |
| 5,926,400 A | 7/1999 | Kytle et al. | |
| 6,072,496 A | 6/2000 | Guenter | |
| 6,226,003 B1 | 5/2001 | Akeley | |

(Continued)

OTHER PUBLICATIONS

K-d-tree.pdf from Wikipedia May 2, 2012 p. 1 introduction of k-d tree.*

(Continued)

*Primary Examiner* — Zhengxi Liu
*Assistant Examiner* — Yi Yang
(74) *Attorney, Agent, or Firm* — Lyon & Harr, LLP; Mark A. Watson

(57) ABSTRACT

A "Point Cloud Smoother" provides various techniques for refining a 3D point cloud or other 3D input model to generate a smoothed and denoised 3D output model. Smoothing and denoising is achieved, in part, by robustly fitting planes to a neighborhood of points around each point of the input model and using those planes to estimate new points and corresponding normals of the 3D output model. These techniques are useful for a number of purposes, including, but not limited to, free viewpoint video (FVV), which, when combined with the smoothing techniques enabled by the Point Cloud Smoother, allows 3D data of videos or images to be denoised and then rendered and viewed from any desired viewpoint that is supported by the input data.

20 Claims, 3 Drawing Sheets

(56) References Cited

U.S. PATENT DOCUMENTS

| | | |
|---|---|---|
| 6,496,601 B1 | 12/2002 | Migdal |
| 6,509,902 B1 | 1/2003 | Pfister et al. |
| 6,556,199 B1 | 4/2003 | Fang et al. |
| 6,781,591 B2 | 8/2004 | Raskar |
| 6,968,299 B1 | 11/2005 | Bernardini et al. |
| 7,023,432 B2 | 4/2006 | Fletcher et al. |
| 7,096,428 B2 | 8/2006 | Foote |
| 7,106,358 B2 | 9/2006 | Valliath |
| 7,142,209 B2 | 11/2006 | Uyttendaele |
| 7,286,143 B2 | 10/2007 | Kang |
| 7,348,976 B2 * | 3/2008 | Mori .................. 345/423 |
| 7,551,232 B2 | 6/2009 | Winger et al. |
| D610,105 S | 2/2010 | Graham |
| 7,671,893 B2 | 3/2010 | Li |
| 7,702,016 B2 | 4/2010 | Winder |
| 7,778,491 B2 | 8/2010 | Steedly |
| 7,840,638 B2 | 11/2010 | Zhang |
| 8,036,491 B2 | 10/2011 | Matsui |
| 8,106,924 B2 | 1/2012 | Aliprandi et al. |
| 8,156,239 B1 | 4/2012 | Ashrafi |
| 8,411,126 B2 | 4/2013 | Lee et al. |
| 8,441,482 B2 * | 5/2013 | Ozdac et al. ............ 345/426 |
| 2002/0186216 A1 * | 12/2002 | Baumberg et al. ....... 345/422 |
| 2002/0196256 A1 | 12/2002 | Hoope |
| 2003/0038892 A1 | 2/2003 | Wang et al. |
| 2003/0085992 A1 | 5/2003 | Arpa et al. |
| 2003/0218672 A1 | 11/2003 | Zhang |
| 2004/0044441 A1 | 3/2004 | Gupta et al. |
| 2004/0217956 A1 * | 11/2004 | Besl et al. ............ 345/419 |
| 2005/0001832 A1 * | 1/2005 | Shen et al. ............ 345/419 |
| 2005/0013465 A1 | 1/2005 | Southall et al. |
| 2005/0017969 A1 | 1/2005 | Sen |
| 2005/0052452 A1 * | 3/2005 | Baumberg ............ 345/419 |
| 2005/0280646 A1 | 12/2005 | Wang |
| 2005/0285875 A1 | 12/2005 | Kang |
| 2005/0286759 A1 | 12/2005 | Zitnick, III et al. |
| 2006/0023782 A1 | 2/2006 | Cai |
| 2006/0028473 A1 | 2/2006 | Uyttendaele |
| 2006/0028489 A1 | 2/2006 | Uyttendaele |
| 2006/0158509 A1 | 7/2006 | Kenoyer |
| 2006/0221072 A1 | 10/2006 | Se et al. |
| 2006/0262856 A1 | 11/2006 | Wu |
| 2006/0290695 A1 | 12/2006 | Salomie |
| 2007/0070177 A1 | 3/2007 | Christensen |
| 2007/0236656 A1 | 10/2007 | Jeong |
| 2007/0237420 A1 | 10/2007 | Steedly et al. |
| 2007/0263080 A1 | 11/2007 | Harrell |
| 2008/0043024 A1 | 2/2008 | Schiwietz et al. |
| 2008/0088626 A1 | 4/2008 | Habe |
| 2008/0298571 A1 | 12/2008 | Kurtz et al. |
| 2009/0033740 A1 | 2/2009 | Ishikawa |
| 2009/0109280 A1 | 4/2009 | Gotsman |
| 2009/0128548 A1 | 5/2009 | Gloudemans |
| 2009/0215533 A1 | 8/2009 | Zalewski et al. |
| 2009/0290811 A1 | 11/2009 | Imai |
| 2009/0315978 A1 | 12/2009 | Wurmlin et al. |
| 2010/0026712 A1 | 2/2010 | Aliprandi |
| 2010/0080448 A1 | 4/2010 | Tam |
| 2010/0142824 A1 | 6/2010 | Lu |
| 2010/0158388 A1 | 6/2010 | Bookout |
| 2010/0201681 A1 | 8/2010 | Criminisi |
| 2010/0225735 A1 | 9/2010 | Shaffer |
| 2010/0259595 A1 | 10/2010 | Trimeche |
| 2010/0262628 A1 | 10/2010 | Singer |
| 2010/0265248 A1 | 10/2010 | McCrae |
| 2010/0303303 A1 * | 12/2010 | Shen et al. ............ 382/107 |
| 2010/0321378 A1 | 12/2010 | Betzler |
| 2010/0328437 A1 | 12/2010 | Lee |
| 2010/0328475 A1 | 12/2010 | Thomas |
| 2010/0329358 A1 | 12/2010 | Zhang |
| 2011/0032251 A1 | 2/2011 | Pothana |
| 2011/0050859 A1 | 3/2011 | Kimmel |
| 2011/0058021 A1 | 3/2011 | Chen |
| 2011/0084983 A1 | 4/2011 | Demaine |
| 2011/0093273 A1 | 4/2011 | Lee |
| 2011/0096832 A1 | 4/2011 | Zhang |
| 2011/0122225 A1 | 5/2011 | Kim et al. |
| 2011/0169824 A1 | 7/2011 | Fujinami et al. |
| 2011/0181685 A1 | 7/2011 | Saleh |
| 2011/0211749 A1 | 9/2011 | Tan |
| 2011/0252320 A1 | 10/2011 | Arrasvuori et al. |
| 2011/0261050 A1 | 10/2011 | Smolic et al. |
| 2011/0267344 A1 | 11/2011 | Germann et al. |
| 2011/0304619 A1 * | 12/2011 | Fu et al. ............ 345/420 |
| 2012/0075303 A1 | 3/2012 | Johnsson |
| 2012/0114039 A1 | 5/2012 | Wang |
| 2012/0127267 A1 | 5/2012 | Zhang et al. |
| 2012/0141016 A1 | 6/2012 | Wildeboer et al. |
| 2012/0155680 A1 | 6/2012 | Chen et al. |
| 2013/0039632 A1 | 2/2013 | Feinson |
| 2013/0257853 A1 * | 10/2013 | Schmidt ............ 345/419 |
| 2013/0286204 A1 | 10/2013 | Cheng |
| 2014/0219550 A1 | 8/2014 | Popa et al. |

OTHER PUBLICATIONS

Guillemaut, et al., "Joint Multi-Layer Segmentation and Reconstruction for Free-Viewpoint Video Applications", Proceedings of International Journal of Computer Vision, May 2009, pp. 73-100.

Tian, et al., "View Synthesis Techniques for 3D Video", Proceedings of SPIE vol. 7443, Sep. 2, 2009, pp. 1-11.

Pollefeys, et al., "Detailed Real-Time Urban 3D Reconstruction from Video", Proceedings of International Journal of Computer Vision, Jul. 2008, pp. 143-167.

Nabeshima, et al., "Frame Rate Stabilization by Variable Resolution Shape Reconstruction for On-line Free-viewpoint Video Generation", Proceedings of Asian Conference on Computer Vision, Jan. 13, 2006, pp. 81-90.

Cooper, Oliver Daniel, "Robust Generation of 3D Models from Video Footage of Urban Scenes", Mar. 2005, pp. 1-219.

Liu, et al., "A Point-Cloud-Based Multiview Stereo Algorithm for Free-Viewpoint Video", Proceedings of IEEE Transactions on Visualization and Computer Graphics, May 2010, pp. 407-418.

Cooper, O. D., Robust generation of 3D models from video footage of urban scenes, Ph.D Thesis, University of Bristol, Mar. 2005.

Gautier, J., E. Bosc, L. Morin, Representation and coding of 3D video data, Nov. 17, 2010, pp. 1-43.

Goldlücke, B., Multi-camera reconstruction and rendering for free-viewpoint video, Ph.D. Thesis, Nov. 29, 2006, pp. 1-164, Max-Planck-Institut für Informatik.

Li, W., Free viewpoint video with image-based rendering, Ph.D Dissertation, May 2010, pp. 1-151, Arizona State University.

Pollefeys, M., D. Nistér, J.-M. Frahm, A. Akbarzadeh, P. Mordohai, B. Clipp, C. Engels, D. Gallup, S. J. Kim, P. Merrell, C. Salmi, S. N. Sinha, B. Talton, L. Wang, Q. Yang, H. Stewénius, R. Yang, G. Welch, H. Towles, Detailed real-time urban 3D reconstruction from video, Int'l J. of Comp. Vision, Jul. 2008, pp. 143-167, vol. 78, No. 2-3.

Sugden, B., M. Iwanicki, Mega meshes: Modelling, rendering and lighting a world made of 100 billion polygons, Game Developers Conf., Feb. 28,-Mar. 4, 2011, pp. 1-67, San Francisco, CA.

Aliaga, D. G., I. Carlbom, A spatial image hierarchy for compression in image-based-rendering, Proc. of the 2005 Int'l Conf. on Image Processing, ICIP 2005, Sep. 11-14, 2005, pp. 609-612, vol. 1, Genoa, Italy.

Arsenault, R., C. Ware, Frustum view angle, observer view angle and VE navigation, Proc. of the 5th Symposium on Virtual Reality, Oct. 7-10, 2002, Fortaleza, CE, Brazil.

Berger, K., K. Ruhl, Y. Schroeder, C. Bruemmer, A. Scholz, M. A. Magnor, Markerless motion capture using multiple color-depth sensors, Proc. of the Vision, Modeling, and Visualization Workshop 2011, VMV 2011, Oct. 4-6, 2011, pp. 317-324, Berlin, Germany.

Bogomjakov, A., C. Gotsmann, M. Magnor, Free-viewpoint video from depth cameras, Proc. Vision, Modeling and Visualization, Nov. 2006, pp. 89-96.

Boukerche, A., R. Jarrar, R. W. Pazzi, A novel interactive streaming protocol for image-based 3D virtual environment navigation, Proc.

(56) References Cited

OTHER PUBLICATIONS of IEEE Int'l Conf. on Communications, ICC 2009, Jun. 14-18, 2009, pp. 1-6, Dresden, Germany.
Carranza, J., C. Theobalt, M. A. Magnor, H.-P. Seidel, Free-viewpoint video of human actors, ACM Trans. Graph., Jul. 2003, pp. 569-577, vol. 22, No. 3.
Deering, M., Geometry compression, Proc. of the 22nd Annual Conf. on Comp. Graphics and Interactive Techniques, SIGGRAPH 1995, Aug. 6-11, 1995, pp. 13-20, Los Angeles, CA, USA.
Do, L., S. Zinger, P.H.N. de With, Quality improving techniques for free-viewpoint DIBR, 3DTV-Conference: The True Vision Capture, Transmission and Display of 3D Video, May 4-6, 2009, pp. 1-4, Potsdam, Germany.
Eisemann, M., F. Klose, M. A. Magnor, Towards plenoptic Raumzeit reconstruction, Video Processing and Computational Video—International Seminar, Oct. 10-15, 2010, pp. 1-24, Dagstuhl Castle, Germany.
Eisert, P., Virtual video conferencing using 3D model-assisted image-based rendering, The 2nd IEE European Conf. on Visual Media Production, CVMP 2005, Nov. 30,-Dec. 1, 2005, pp. 185-193.
Ekmekcioglu, E., B. Gunel, M. Dissanayake, S. T. Worrall, A. M. Kondoz, A scalable multi-view audiovisual entertainment framework with content-aware distribution, 17th IEEE Int'l Conf. on Image Processing, ICIP 2010, Sep. 26-29, 2010, pp. 2401-2404, Hong Kong.
Fitzgibbon, A. W., Y. Wexler, A. Zisserman, Image-based rendering using image-based priors, 9th IEEE Int'l Conf. on Comp. Vision, ICCV 2003, Oct. 14-17, 2003, pp. 1176-1183, Nice, France.
Grau, O., Multi-view 4D reconstruction of human action for entertainment applications, Research and Development White Paper, British Broadcasting Company, Nov. 2011, pp. 1-21.
Guillemaut, J.-Y., A. Hilton, Joint multi-layer segmentation and reconstruction for free-viewpoint video applications, Int'l J. of Comp. Vision, May 2011, pp. 73-100, vol. 93, No. 1.
Hornung, A., L. Kobbelt, Interactive pixel-accurate free viewpoint rendering from images with silhouette aware sampling, Comput. Graph. Forum, Dec. 2009, pp. 2090-2103, vol. 28, No. 8.
Kilner, J., J. Starck, A. Hilton, A comparative study of free-viewpoint video techniques for sports events, European Conf. on Visual Media Production, Nov. 29-30, 2006, pp. 87-96.
Kim, Y. M., D. Chan, C. Theobalt, S. Thrun, Design and calibration of a multi-view TOF sensor fusion system, IEEE Comp. Society Conf. on Comp. Vision and Pattern Recognition Workshops, CVPRW 2008, Jun. 23-28, 2008, pp. 1-7.
Kurashima, C. S., R. Yang, A. Lastra, Combining approximate geometry with view-dependent texture mapping—A hybrid approach to 3D video teleconferencing, 15th Brazilian Symposium on Comp. Graphics and Image Processing, SIBGRAPI 2002, Oct. 7-10, 2002, pp. 112-119, Fortaleza-CE, Brazil.
Kuster, C., T. Popa, C. Zach, C. Gotsman, M. H. Gross, FreeCam: A hybrid camera system for interactive free-viewpoint video, Proc. of the Vision, Modeling, and Visualization Workshop 2011, VMV 2011, Oct. 4-6, 2011, pp. 17-24, Berlin, Germany.
Lai, K.-K., Y.-L. Chan, C.-H. Fu, W.-C. Siu, Viewpoint switching in multiview videos using SP-frames, Proc. of the Int'l Conf. on Image Processing, ICIP 2008, Oct. 12-15, 2008, pp. 1776-1779, San Diego, California, USA.
Lamboray, E., S. Würmlin, M. Waschbüsch, M. H. Gross, H. Pfister, Unconstrained free-viewpoint video coding, Proc. of the 2004 Int'l Conf. on Image Processing, ICIP 2004, Oct. 24-27, 2004, pp. 3261-3264, Singapore.
Lei, C., Y.-H. Yang, Efficient geometric, photometric, and temporal calibration of an array of unsynchronized video cameras, Sixth Canadian Conf. on Comp. and Robot Vision, CRV 2009, May 25-27, 2009, pp. 162-169, Kelowna, British Columbia, Canada.
Lipski, C., C. Linz, K. Berger, A. Sellent, M. A. Magnor, Virtual video camera: Image-based viewpoint navigation through space and time, Comput. Graph. Forum, Dec. 2010, pp. 2555-2568, vol. 29, No. 8.
Liu, Y., Q. Dai, W. Xu, A point-cloud-based multiview stereo algorithm for free-viewpoint video, IEEE Trans. Vis. Comput. Graph., May/Jun. 2010, pp. 407-418, vol. 16, No. 3.
Liu, S., K. Kang, J.-P. Tarel, D. B. Cooper, Free-form object reconstruction from silhouettes, occluding edges and texture edges: A unified and robust operator based on duality, IEEE Trans. Pattern Anal. Mach. Intell., Jan. 2008, pp. 131-146, vol. 30, No. 1.
Lu, Z., Y.-W. Tai, M. Ben-Ezra, M. S. Brown, A framework for ultra high resolution 3D imaging, The Twenty-Third IEEE Conf. on Comp. Vision and Pattern Recognition, CVPR 2010, Jun. 13-18, 2010, pp. 1205-1212, San Francisco, CA, USA.
Morvan, Y., D. Farin, P. De With, System architecture for free-viewpoint video and 3D-TV, IEEE Transactions on Consumer Electronics, May 2008, pp. 925-932, vol. 54, No. 2.
Nabeshima, R., M. Ueda, D. Arita, R. Taniguchi, Frame rate stabilization by variable resolution shape reconstruction for on-line free-viewpoint video generation, Proc. of the 7th Asian Conf. on Comp. Vision, Jan. 13-16, 2006, pp. 81-90, Hyderabad, India.
Piatti, D., Time-of-flight cameras: Tests, calibration and multi-frame registration for automatic 3D object reconstruction, 2011, pp. 1-10.
Shi, S., W. J. Jeon, K. Nahrstedt, R. H. Campbell, Real-time remote rendering of 3D video for mobile devices, Proc. of the 17th Int'l Conf. on Multimedia 2009, ACM Multimedia 2009, Oct. 19-24, 2009, pp. 391-400, Vancouver, British Columbia, Canada.
Smolić, A., K. Müller, P. Merkle, T. Rein, M. Kautzner, P. Eisert, T. Wiegand, Free viewpoint video extraction, representation, coding, and rendering, Proc. of the 2004 Int'l Conf. on Image Processing, ICIP 2004, Oct. 24-27, 2004, pp. 3287-3290, vol. 5, Singapore.
Smolić, A., P. Kauff, Interactive 3D video representation and coding technologies, Invited Paper, Proc. of the IEEE, Special Issue on Advances in Video Coding and Delivery, Jan. 2005, pp. 98-110, vol. 93, No. 1.
Starck, J., J. Kilner, A. Hilton, A free-viewpoint video renderer, J. Graphics, GPU, & Game Tools, 2009, pp. 57-72, vol. 14, No. 3.
Kilner, J., J. Starck, J.-Y. Guillemaut, A. Hilton, Objective quality assessment in free-viewpoint video production, Sig. Proc.: Image Comm., Jan. 2009, pp. 3-16, vol. 24, No. 1-2.
Starck, J., J. Kilner, A. Hilton, Objective quality assessment in free-viewpoint video production, 3DTV Conf.: The True Vision—Capture, Transmission and Display of 3D Video, May 28-30, 2008, pp. 225-228, Istanbul, Turkey.
Theobalt, C., M. Li, M. A. Magnor, H.-P. Seidel, A flexible and versatile studio for synchronized multi-view video recording, Vision, Video, and Graphics, WG 2003, Jul. 10-11, 2003, pp. 9-16, University of Bath, UK.
Tian, D. P.-L. Lai, P. Lopez, C. Gomila, View synthesis techniques for 3D video, Proc. of the SPIE Applications of Digital Image Processing XXXII, Sep. 2009, pp. 74430T-74430T-11, vol. 7443.
Vertegaal, R., I. Weevers, C. Sohn, C. Cheung, Gaze-2: Conveying eye contact in group video conferencing using eye-controlled camera direction, Proc. of the 2003 Conf. on Human Factors in Computing Systems, CHI 2003, Apr. 5-10, 2003, pp. 521-528, Ft. Lauderdale, Florida, USA.
Wei, X., L. Yin, Z. Zhu, Q. Ji, Avatar-mediated face tracking and lip reading for human computer interaction, Proc. of the 12th Acm Int'l Conf. on Multimedia, ACM Multimedia 2004, Oct. 10-16, 2004, pp. 500-503, New York, NY, USA.
Wikipedia, Hidden surface determination, Apr. 23, 2012, pp. 1-4.
Würmlin, S., E. Lamboray, M. Waschbusch, M. Gross, Dynamic point samples for free-viewpoint video, Proc. of the Picture Coding Symposium, Dec. 15-17, 2004, pp. 6, San Francisco, CA.
Würmlin, S., E. Lamboray, M. Waschbüsch, P. Kaufman, A. Smolić, M. Gross, Image-space free-viewpoint video, Vision, Modeling, and Visualization, VMV 2005, Nov. 16-18, 2005, pp. 453-460, Erlangen, Germany.
Yea, S., A. Vetro, View synthesis prediction for multiview video coding, Sig. Proc.: Image Comm., Jan. 2009, pp. 89-100, vol. 24, No. 1-2.
Yea, S., A. Vetro, View synthesis prediction for rate-overhead reduction in FTV, 3DTV Conf.: The True Vision—Capture, Transmission and Display of 3D Video, May 28-30, 2008, pp. 145-148, Istanbul, Turkey.

(56) References Cited

OTHER PUBLICATIONS

Zhu, Y., A novel view multi-view synthesis approach for free viewpoint video, Int'l Joint Conf. on Artificial Intelligence, JCAI '09, Apr. 25-26, 2009, pp. 88-91, Hainan Island, China.

Ziegler, G., H. P. A. Lensch, M. Magnor, H.-P. Seidel, Multi-video compression in texture space using 4D SPIHT, 2004 IEEE 6th Workshop on Multimedia Signal Processing, Sep. 29,-Oct. 1, 2004, pp. 39-42, MPI Informatik, Saarbrucken, Germany.

Zitnick, C. L., S. B. Kang, M. Uyttendaele, S. A. J. Winder, R. Szeliski, High-quality video view interpolation using a layered representation, ACM Trans. Graph., Aug. 2004, pp. 600-608, vol. 23, No. 3.

Morvan, Y., and C. O'Sullivan, Visual tuning of an image-based rendering algorithm, Proceedings of Eurographics, Oct. 2006, pp. 1-6, Ireland, Dublin.

Chang et al., Principal Component Analysis-based Mesh Decomposition, J. Inf. Sci. Eng., May 2009, vol. 25, No. 4, pp. 971-987.

Kalvin et al., Superfaces: Polygonal Mesh Simplification with Bounded Error, J. IEEE Comp. Graphics and Applications, May 1996, vol. 16, No. 3, pp. 64-77.

Kanade et al., Virtualized Reality: Constructing Virtual Worlds from Real Scenes, IEEE Multimedia, Immersive Telepresence, Jan. 1997, vol. 4, No. 1, pp. 34-47.

Morvan, Y., C. O'Sullivan, Visual Tuning of an Image-Based Rendering Algorithm, Proc. of Eurographics, Oct. 2006, pp. 1-6, Ireland, Dublin.

Newcombe et al., Live Dense Reconstruction with a Single Moving Camera, The Twenty-Third IEEE Conf. on Comp. Vision and Pattern Recognition, CVPR 2010, Jun. 2010, pp. 1498-1505, San Francisco, CA, USA.

Rus et al., Analysing the Influence of Vertex Clustering on PCA-Based Dynamic Mesh Compression, Proc. of the 6th Int'l Conf. on Articulated Motion and Deformable Objects, AMDO 2010, Jul. 2010, pp. 55-66, Port d'Andratx, Mallorca, Spain.

Rusinkiewicz et al., Qsplat: A Multiresolution Point Rendering System for Large Meshes, Proc. of the 27th Annual Conf. on Comp. Graphics, SIGGRAPH 2000, Jul. 23-28, 2000, pp. 343-352, New Orleans, Louisiana, USA.

Wills, Diane M., U.S. Office Action, U.S. Appl. No. 13/599,263, May 29, 2014, pp. 1-19.

Matthies, L., M. Okutomi, A Bayesian foundation for active stereo vision, Proc. of SPIE Conf. 1198, Sensor Fusion II: Human and Machine Strategies, Nov. 1989, pp. 62-74.

Rankin, A. L., C. F. Bergh, S. B. Goldberg, P. Bellutta, A. Huertas, L. H. Matthies, Passive perception system for day/night autonomous off-road navigation, Proc. SPIE, Jun. 2, 2005, vol. 5804, Unmanned Ground Vehicle Technology VII, pp. 343-358.

Würmlin, S., E. Lamboray, M. Gross, 3D video fragments: Dynamic point samples for real-time free-viewpoint video, Computers and Graphics, Feb. 2004, vol. 28, No. 1, pp. 3-14.

Hajnik, Daniel F., U.S. Office Action, U.S. Appl. No. 13/599,170, Sep. 30, 2014, pp. 1-25.

Cain, Leon T., U.S. Office Action, U.S. Appl. No. 13/614,852, Oct. 31, 2014, pp. 1-19.

Mamou, K. et al., A simple and efficient approach for 3D mesh approximate convex decomposition, 16th Int'l Conf. on Image Processing, ICIP, Nov. 2009, pp. 3501-3504, Cairo, Egypt.

Wills, Diane M., U.S. Notice of Allowance, U.S. Appl. No. 13/599,263, Aug. 21, 2014, pp. 1-7.

Cooke et al., Multiple image view synthesis for free viewpoint video applications, IEEE International Conference on Image Processing, Sep. 2005, vol. 1, pp. 1-4.

Mathis, Normal map workflow, Oct. 18, 2005, http://www.poopinmymouth.com/tutorial/normal_workflow.htm.

Miller, G., High quality novel view rendering from multiple cameras, Doctor of Philosphy, University of Surrey, Centre for Vision, Speech and Signal Processing, School of Electronics and Physical Sciences, Dec. 2007, pp. 1-173.

Zinger, Free-viewpoint depth image based rendering, Preprint submitted to Visual Communication and Image Representation, Jun. 26, 2009, pp. 1-27.

Wu, Chong, U.S. Office Action, U.S. Appl. No. 13/744,885, Feb. 12, 2015, pp. 1-19.

Nguyen, Kimbinh, U.S. Office Action, U.S. Appl. No. 13/599,436, Mar. 2, 2015, pp. 1-17.

Joshi, Sunita, U.S. Office Action, U.S. Appl. No. 13/599,678, Apr. 1, 2015, pp. 1-32.

Hajnik, Daniel F., U.S. Final Office Action, U.S. Appl. No. 13/599,170, Jan. 27, 2015, pp. 1-29.

Abimbola, Kehinde, U.S. Office Action, U.S. Appl. No. 13/588,917, Mar. 4, 2015, pp. 1-36.

Kurutepe, E., Civanlar, M.R., Tekalp, A.M., Client-driven selective streaming of multiview video for interactive 3DTV, IEEE Transactions on Circuits and Systems for Video Technology, Nov. 2007, vol. 17, No. 11, pp. 1558-1565.

Yang, Z., Yu, B., Nahrstedt, K., Bajscy, R., A multi-stream adaptation framework for bandwidth management in 3D tele-immersion, May 2006, Proc. of the 2006 Int'l Workshop on Network and operating systems support for digital audio and video, pp. 14.

Nguyen, Phung Hoang Joseph, U.S. Office Action, U.S. Appl. No. 13/602,097, Jun. 1, 2015, pp. 1-9.

Teitelbaum, Michael E., U.S. Office Action, U.S. Appl. No. 13/566,877, Jun. 8, 2015, pp. 1-13.

Ma, Tze, U.S. Office Action, U.S. Appl. No. 13/598,536, Jun. 26, 2015, pp. 1-16.

He, Weiming, U.S. Office Action, U.S. Appl. No. 13/790,158, Apr. 28, 2015, pp. 1-27.

Cain, Leon T., U.S. Final Office Action, U.S. Appl. No. 13/614,852, Apr. 30, 2015, pp. 1-23.

Nguyen, Kimbinh, U.S. Final Office Action, U.S. Appl. No. 13/599,436, Jun. 19, 2015, pp. 1-20.

Hajnik, Daniel F., U.S. Office Action, U.S. Appl. No. 13/599,170, May 18, 2015, pp. 1-25.

* cited by examiner

SMOOTHING AND ROBUST NORMAL ESTIMATION FOR 3D POINT CLOUDS

CROSS-REFERENCE TO RELATED APPLICATIONS

This application claims the benefit under Title 35, U.S. Code, Section 119(e), of a previously filed U.S. Provisional Patent Application Ser. No. 61/653,983 filed on May 31, 2012, by Simonnet, et al., and entitled "INTERACTIVE SPATIAL VIDEO," the subject matter of which is incorporated herein by reference.

BACKGROUND 3D scanning tools are often used to scan a 3D surface to generate corresponding 3D point clouds. These point clouds are then typically used for constructing 3D point- or mesh-based digital models of the scanned surface. Unfortunately, due to many possible sources of noise during the scanning process, the resulting 3D models tend to be noisy.

A number of conventional techniques for removing noise while attempting to preserve underlying features of such models have been developed. In most cases, denoising of the sampled data or 3D mesh or model can be applied either before or after generating the model.

Techniques such as mesh smoothing operate by filtering or otherwise adjusting a 3D input surface to increase a degree of smoothness of that surface by denoising the data representing that surface. For example, one recent technique provides a bilateral denoising filter for 3D point clouds that operates by filtering vertices of a corresponding 3D mesh. This technique generally filters vertices in the normal direction using local neighborhoods to denoise the mesh while partially preserving local features. Unfortunately, existing techniques for smoothing or denoising 3D surfaces, models, meshes or point clouds tend to remove noise while partially blurring out fine details of 3D features. Further, these methods tend to produce at least some degree of shrinkage or drifting of the 3D surfaces.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Point Cloud Smoother," as described herein, provides various techniques for refining a 3D point cloud or other 3D input model to generate a smoothed and denoised 3D output model by robustly fitting planes to each point of the input model and using those planes to estimate new points and corresponding normals of the 3D output model. These techniques are useful for a number of purposes, including, but not limited to, generation of free viewpoint video (FVV) which allows 3D data of videos or images to be rendered and viewed from any desired viewpoint that is supported by the input data.

More specifically, the 3D smoothing techniques enabled by the Point Cloud Smoother generally begin by fitting small planes to localized regions of a 3D input model or point cloud using a robust estimator, and then using these planes to identify new points corresponding to a 3D output model. In particular, plane fitting is performed for each point in the input model by first finding a set of the nearest neighbors for each point. Various robust estimation techniques (e.g., RANSAC, MLESAC, LMS, MUSE, ALKS, RESC, ASSC, etc.) are then used to fit a plane to each point and its set of nearest neighbors. Each point is then projected some or all of the way along a corresponding normal of the corresponding plane to the surface of that plane. Together, the projected points of the input model represent a new set of output points corresponding to a 3D output model.

In addition, a new normal for each point of the 3D output model is determined by finding a set of the nearest neighbors to each output point, fitting a new plane to each output point and its set of nearest neighbors, and computing a normal direction for each plane. The normal direction for each of these new planes is then assigned to each corresponding point to complete the 3D output model.

In view of the above summary, it is clear that the Point Cloud Smoother described herein provides various techniques for smoothing 3D point clouds or other 3D models. In addition to the just described benefits, other advantages of the Point Cloud Smoother will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Point Cloud Smoother," as described herein, provides various techniques for refining a 3D point clouds or other 3D input models to generate smoothed and denoised 3D output models. Smoothing and denoising is achieved, in part, by robustly fitting planes to a neighborhood of points around and including each point of the input model and using those planes to estimate new points of the 3D output model. Normals for the points of the 3D output model are then determined by performing another round of plane fitting to a neighborhood of points around and including each point of the 3D output model. Normal directions or vectors are then computed for each of these planes and assigned to each corresponding point of the 3D output model. These techniques are useful for a number of purposes, including, but not limited to, free viewpoint video (FVV), which, when combined with the smoothing techniques enabled by the Point Cloud Smoother, allows 3D data of videos or images to be denoised and then rendered and viewed from any desired viewpoint that is supported by the input data.

Figure 1:
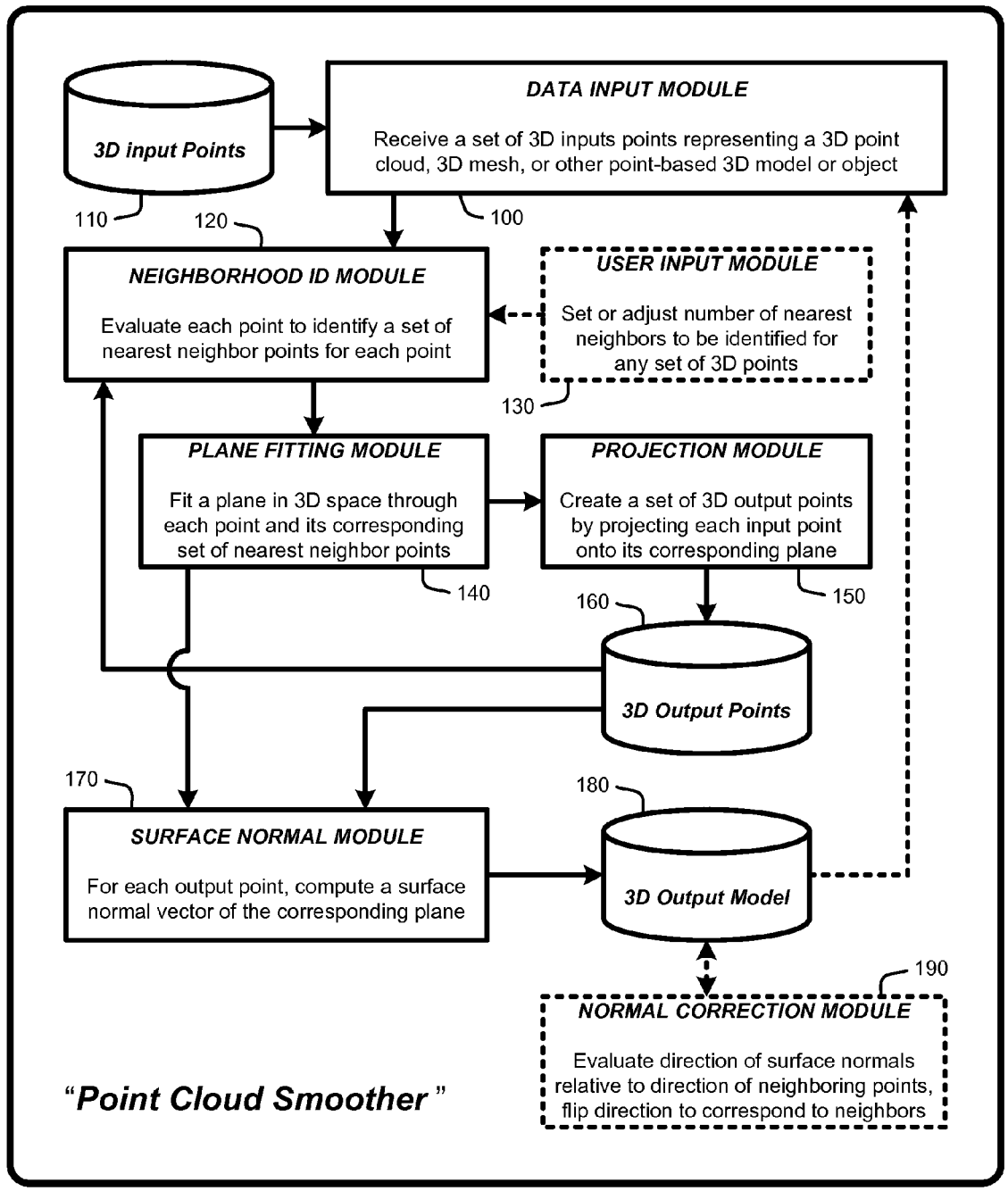
FIG. 1 provides an exemplary architectural flow diagram that illustrates program modules for implementing various embodiments of the Point Cloud Smoother, as described herein.

1.1 System Overview:

As noted above, the "Point Cloud Smoother," provides various techniques for refining a 3D point clouds or other 3D input models to generate smoothed and denoised 3D output models. The processes summarized above are illustrated by the general system diagram of FIG. 1. In particular, the system diagram of FIG. 1 illustrates the interrelationships between program modules for implementing various embodiments of the Point Cloud Smoother, as described herein. Furthermore, while the system diagram of FIG. 1 illustrates a high-level view of various embodiments of the Point Cloud Smoother, FIG. 1 is not intended to provide an exhaustive or complete illustration of every possible embodiment of the Point Cloud Smoother as described throughout this document.

In addition, it should be noted that any boxes and interconnections between boxes that may be represented by broken or dashed lines in FIG. 1 represent alternate embodiments of the Point Cloud Smoother described herein, and that any or all of these alternate embodiments, as described below, may be used in combination with other alternate embodiments that are described throughout this document.

In general, as illustrated by FIG. 1, the processes enabled by the Point Cloud Smoother begin operation by using a data input module 100 to receive a set of 3D input points 110 representing a 3D point cloud, 3D mesh, or other point-based 3D model or object. Typically, the 3D input points 110 are derived from pre-existing 3D models or point clouds, or 3D point clouds generated by any desired 3D scanning technique (e.g., stereo depth evaluation techniques, laser depth scanning, etc.).

A neighborhood ID module 120 is then used to evaluate each point in the set of 3D input points 110, to identify a set of nearest neighbors around each input point. In general, the number of neighbors is fixed at some relatively small number or is optionally set or adjusted to any desired value via a user input module 130 or other input mechanism. Further, in various embodiments, computational time for identifying the nearest neighbors of each input point is reduced by pre-processing the set of 3D input points 110 to construct a corresponding 3D index tree of the input points from which neighboring points can be quickly selected or identified.

Next, a plane fitting module 140 is used to fit a plane in 3D space to each input point and its corresponding set of nearest neighbors using a robust estimator (e.g., RANSAC, MLESAC, LMS, MUSE, ALKS, RESC, ASSC, etc.) or other data or shape fitting technique. A projection module 150 then uses these planes to create a set of 3D output points 160 by projecting each input point onto its corresponding plane. The resulting intersection of the 3D input point with its corresponding plane represents the 3D spatial location of each corresponding 3D output point.

The set of 3D output points 160 is then passed back to the neighborhood IS module 120 that evaluates each point in the set of 3D output points 160, to identify a set of nearest neighbors around each output point. As with the set of input points, the number of neighbors around each output point is fixed at some relatively small number or is optionally set or adjusted to any desired value via the user input module 130 or other input mechanism. Note that the number of neighbors around input points and output points can be the same, if desired, though there is no requirement for the number of neighbors to be the same. Again, as with the input points, computational time for identifying the nearest neighbors of each output point is optionally reduced by pre-processing the set of 3D output points 160 to construct a corresponding 3D index tree of the output points from which neighboring points can be quickly selected or identified.

Next, the plane fitting module 140 is used to fit a plane in 3D space to each output point and its corresponding set of nearest neighbors using a robust estimator or other data or shape fitting technique. The planes associated with the set of 3D output points 160 are then passed to a surface normal module 170 that uses each of these planes to compute corresponding normal directions or vectors for each plane. Each computed normal is then assigned to the corresponding output point to generate a smoothed and denoised 3D output model 180.

One or more further iterations of smoothing are then optionally performed by providing the 3D output model 180 back to the data input module 100 for use as a new set of 3D input points 110 that is then used to generate a new 3D output model using the processes and techniques described above.

Finally, in another optional embodiment, a normal correction module 190 is used to evaluate normal directions for points in localized regions of the 3D output model relative to the normal direction of neighboring points. It has been observed that where the input data is highly noisy, in rare cases, normals may occasionally be inverted or reversed (i.e., 180 degrees in the wrong direction) relative to surrounding points. In such cases, the normal correction module 190 acts to flip or reverse the normal direction of one or more points to correspond to the general direction of the normal direction of those neighbors. Note that the number of neighbors evaluated for this purpose can be set at a predetermined value, or set or adjusted to any number desired.

2.0 Operational Details of the Point Cloud Smoother:

The above-described program modules are employed for implementing various embodiments of the Point Cloud Smoother. As summarized above, the Point Cloud Smoother provides various techniques for refining a 3D point clouds or other 3D input models to generate smoothed and denoised 3D output models. The following sections provide a detailed discussion of the operation of various embodiments of the Point Cloud Smoother, and of exemplary methods for implementing the program modules described in Section 1 with respect to FIG. 1.

In particular, the following sections provides examples and operational details of various embodiments of the Point Cloud Smoother, including:

an operational overview of the Point Cloud Smoother;
3D point clouds and models;
fitting planes using robust estimators or other data fitting techniques;
projecting 3D points onto fitted planes; and
computing of surface normals for points of the 3D output model.

2.1 Operational Overview:

In general, a "Point Cloud Smoother," as described herein, provides various techniques for refining a 3D point cloud or other 3D input model to generate a smoothed and denoised 3D output model by robustly fitting planes to each point of the input model and using those planes to estimate new points and corresponding normals of the 3D output model. These techniques are useful for a number of purposes, including, but not limited to, generation of free viewpoint video (FVV) which allows 3D data of videos or images to be rendered and viewed from any desired viewpoint that is supported by the input data.

2.2 3D Point Clouds or Models:

As is well-known to those skilled in the art, a 3D point cloud is a set of points or vertices in a 3D coordinate system. These vertices are usually defined by x, y, and z coordinates, and typically represent the external surface of an object. 3D point clouds or models can be generated or constructed using a wide variety of techniques. For example, Point clouds are often created by 3D scanners, including laser-based scanners, LIDAR systems, etc., and may also be created using other techniques such as, for example, stereo imaging where multiple images of a scene are used to construct pixel or point-based depth maps of scenes or objects in a scene. In general, 3D scanners process objects to identify large numbers of surface points on the object to produce a 3D point cloud representing the object surface.

In the case that a mesh-based 3D model is provided as input, mesh vertices can be treated as individual points to provide the point cloud that is processed by the Point Cloud Smoother. Further, 3D point clouds or models used as input can be pre-filtered or pre-processed in any manner desired (e.g., remove or attenuate outliers) prior to processing by the Point Cloud Smoother, though such pre-processing is generally not necessary.

2.3 Fitting Planes using Robust Estimator:

A number of robust estimation techniques have been developed for fitting data. These techniques include, but are not limited to, random sample consensus (RANSAC), maximum-likelihood sample consensus (MLESAC), least median of squares (LMS), minimum unbiased scale estimator (MUSE), adaptive least $k^{th}$ order squares (ALKS), residual sample consensus (RESC), adaptive scale sample consensus (ASSC), etc. In addition to these types of robust estimation techniques, any desired data or shape fitting technique can be adapted for use with the Point Cloud Smoother to fit planes to sets of 3D data points (i.e., each point and its set of neighbors).

2.4 Projecting Points Onto Fitted Planes:

In the case of the 3D input points, the planes resulting from the data fitting process are used as a surface onto which the 3D input points are projected along the normal of each point. The resulting intersection of the 3D input point with its corresponding plane represents the 3D spatial location of each corresponding 3D output point.

2.5 Computing Surface Normals for Points of the 3D Output Model:

In the case of 3D output points, the planes resulting from the data fitting process are used to compute normal vectors or directions (i.e., perpendicular to the plane), with the resulting vector or direction being assigned to the corresponding 3D output point. The combination of 3D output points and corresponding normals then defines a 3D output point cloud that can be used directly, or converted to any desired type of 3D output model.

In particular, given the smoothed and denoised 3D point cloud and associated normal produced as output by the Point Cloud Smoother, many well-known techniques exist for converting that point cloud to any of a number of different formats or model types for use in a wide range of 3D modeling applications. For example, while point clouds can be directly rendered, point clouds themselves are generally not directly usable in most 3D applications, and therefore are usually converted to polygon or triangle mesh models, NURBS surface models, or CAD models through a process commonly referred to as surface reconstruction. There are many existing techniques for converting a point cloud to a 3D surface. Some approaches, like Delaunay triangulation, alpha shapes, and ball pivoting, build a network of triangles over the existing vertices of the point cloud, while other approaches convert the point cloud into a volumetric distance field and reconstruct the implicit surface so defined through a marching cubes algorithm. The Point Cloud Smoother is adaptable for use with any such techniques to construct 3D output models of any desired type.

Figure 2:
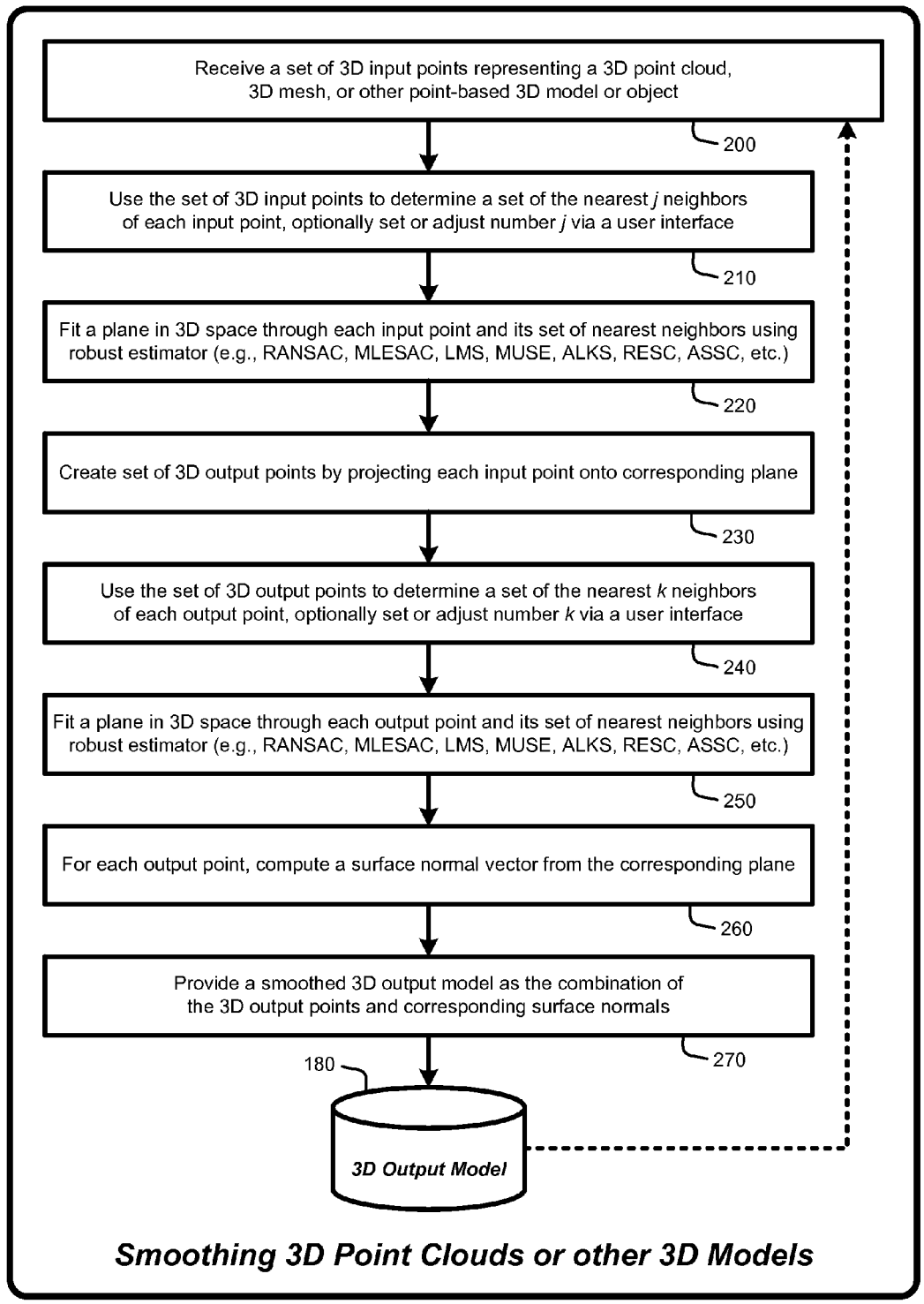
FIG. 2 illustrates a general system flow diagram that illustrates exemplary methods for implementing various embodiments of the Point Cloud Smoother, as described herein.

3.0 Operational Summary of the Point Cloud Smoother:

The processes described above with respect to FIG. 1 and in further view of the detailed description provided above in Sections 1 and 2 are illustrated by the general operational flow diagram of FIG. 2. In particular, FIG. 2 provides an exemplary operational flow diagram that summarizes the operation of some of the various embodiments of the Point Cloud Smoother. Note that FIG. 2 is not intended to be an exhaustive representation of all of the various embodiments of the Point Cloud Smoother described herein, and that the embodiments represented in FIG. 2 are provided only for purposes of explanation.

Further, it should be noted that any boxes and interconnections between boxes that are represented by broken or dashed lines in FIG. 2 represent optional or alternate embodiments of the Point Cloud Smoother described herein, and that any or all of these optional or alternate embodiments, as described below, may be used in combination with other alternate embodiments that are described throughout this document.

In general, as illustrated by FIG. 2, the Point Cloud Smoother begins operation by receiving 200 a set of 3D input points representing a 3D point cloud, 3D mesh, or other point-based 3D model or object. As noted above, pre-existing models or point clouds, or 3D point clouds generated by any desired 3D scanning technique may be used as input by the Point Cloud Smoother to generate a smoothed 3D output model.

Given the set of 3D input points, the Point Cloud Smoother uses those 3D input points to determine 210 or identify a set of the nearest j neighbors of each input point. As noted above, the number of neighbors is optionally set or adjusted via a user interface. Further, as noted above, in various embodiments, computational time for identifying nearest neighbors of each input point is reduced by pre-processing the set of 3D input points to construct a corresponding 3D index tree of the input points from which neighboring points can be quickly selected.

Next, the Point Cloud Smoother fits 220 a plane in 3D space through each input point and its corresponding set of nearest neighbors using a robust estimator (e.g., RANSAC, MLESAC, LMS, MUSE, ALKS, RESC, ASSC, etc.). The Point Cloud Smoother then uses these planes to create a set of 3D output points by projecting 230 each input point onto its corresponding plane. The resulting intersection of the 3D input point with its corresponding plane represents the 3D spatial location of each corresponding 3D output point.

The Point Cloud Smoother then uses the set of 3D output points to determine 240 or identify a set of the nearest k neighbors of each input point. Note that while the number of neighbors, k, for each output point may be the same as the number of neighbors, j, used for each input point, there is no requirement that j and k are the same. Again, the number of neighbors is optionally set or adjusted via a user interface. Further, as noted above, in various embodiments, computational time for identifying nearest neighbors of each output point is reduced by pre-processing the set of 3D output points to construct a corresponding 3D index tree of the output points from which neighboring points can be quickly selected.

Next, the Point Cloud Smoother fits 250 a plane in 3D space through each output point and its corresponding set of nearest neighbors using a robust estimator. The Point Cloud Smoother then uses each of these planes to compute 260 corresponding normal vectors for each output point. Finally, the Point Cloud Smoother provides 270 a smoothed 3D output model 180 as the combination of the 3D output points and the corresponding surface normals.

One or more further iterations of smoothing are then optionally performed by providing the 3D output model 180 to the Point Cloud Smoother for use as a new set of 3D input points that is then used to generate a new 3D output model using the processes and techniques described above. Note that the number of neighboring points around both input points and output points can be adjusted to any desired values for any additional iterations of smoothing.

Figure 3:
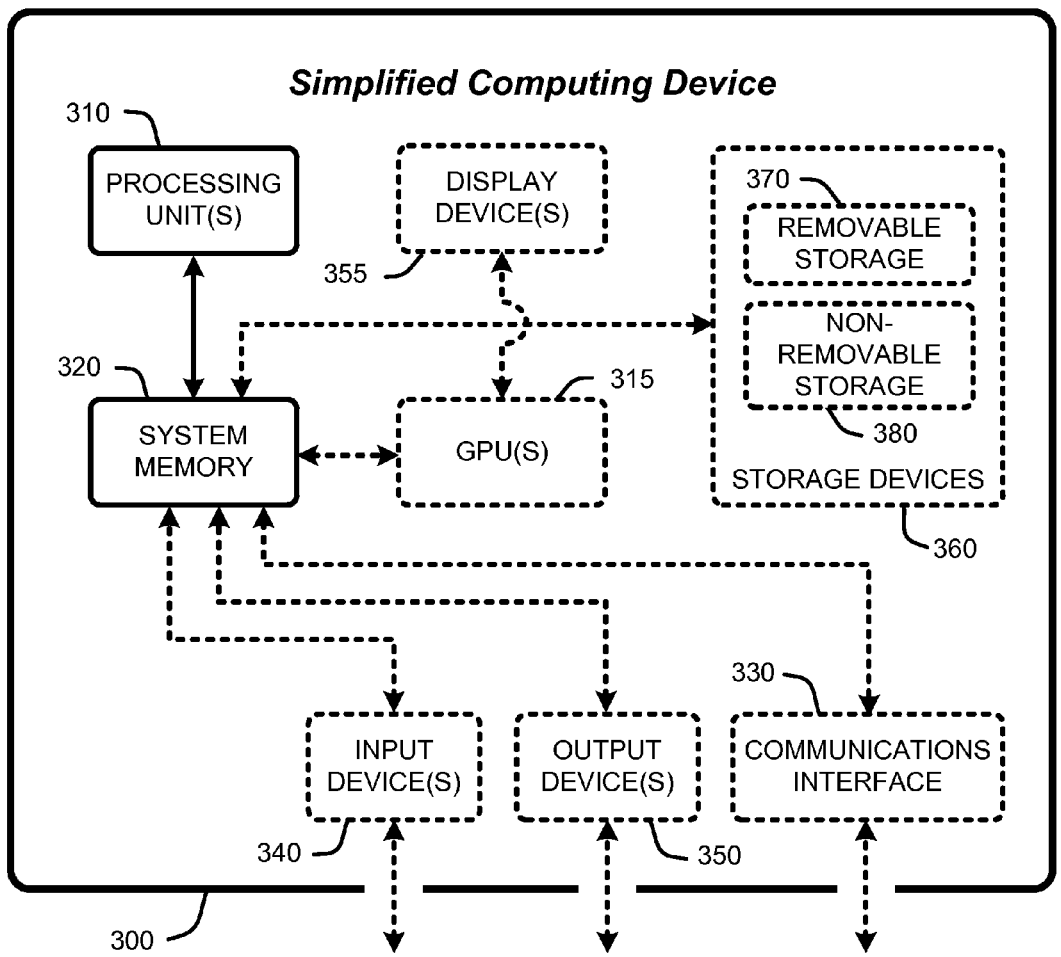
FIG. 3 is a general system diagram depicting a simplified general-purpose computing device having simplified computing and I/O capabilities for use in implementing various embodiments of the Point Cloud Smoother, as described herein.

4.0 Exemplary Operating Environments:

The Point Cloud Smoother described herein is operational within numerous types of general purpose or special purpose computing system environments or configurations. FIG. 3 illustrates a simplified example of a general-purpose computer system on which various embodiments and elements of the Point Cloud Smoother, as described herein, may be implemented. It should be noted that any boxes that are represented by broken or dashed lines in FIG. 3 represent alternate embodiments of the simplified computing device, and that any or all of these alternate embodiments, as described below, may be used in combination with other alternate embodiments that are described throughout this document.

For example, FIG. 3 shows a general system diagram showing a simplified computing device such as computer 300. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Point Cloud Smoother, the device should have a sufficient computational capability and system memory to enable basic computational operations. In particular, as illustrated by FIG. 3, the computational capability is generally illustrated by one or more processing unit(s) 310, and may also include one or more GPUs 315, either or both in communication with system memory 320. Note that that the processing unit(s) 310 of the general computing device of may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 3 may also include other components, such as, for example, a communications interface 330. The simplified computing device of FIG. 3 may also include one or more conventional computer input devices 340 (e.g., pointing devices, keyboards, audio input devices, video input devices, haptic input devices, devices for receiving wired or wireless data transmissions, etc.). The simplified computing device of FIG. 3 may also include other optional components, such as, for example, one or more conventional computer output devices 350 (e.g., display device(s) 355, audio output devices, video output devices, devices for transmitting wired or wireless data transmissions, etc.). Note that typical communications interfaces 330, input devices 340, output devices 350, and storage devices 360 for general-purpose computers are well known to those skilled in the art, and will not be described in detail herein.

The simplified computing device of FIG. 3 may also include a variety of computer readable media. Computer readable media can be any available media that can be accessed by computer 300 via storage devices 360 and includes both volatile and nonvolatile media that is either removable 370 and/or non-removable 380, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Point Cloud Smoother described herein, or portions thereof, may be stored, received, transmitted, or read from any desired combination of computer or machine readable media or storage devices and communication media in the form of computer executable instructions or other data structures.

Finally, the Point Cloud Smoother described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Point Cloud Smoother has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Point Cloud Smoother. It is intended that the scope of the invention be limited not by this detailed description, but rather by the claims appended hereto.

What is claimed is:

1. A computer-implemented process for smoothing 3D models, comprising using a computer to perform process actions for:
   receiving a set of 3D input points representing a 3D input model;
   using the set of 3D input points to determine a set of the nearest j neighbors of each input point;
   for each input point, fitting a corresponding plane in 3D space to the point and its set of nearest j neighbors;
   creating a set of 3D output points by projecting each input point onto its corresponding plane;
   using the set of 3D output points to determine a set of the nearest k neighbors of each output point;
   for each output point, fitting a corresponding plane in 3D space to the point and its set of nearest k neighbors;
   for each output point, computing a corresponding surface normal from the corresponding plane; and
   wherein the set of 3D output points and corresponding surface normals represent a smoothed 3D output model.

2. The computer-implemented process of claim 1 further comprising constructing a corresponding 3D index tree from any set of 3D points.

3. The computer-implemented process of claim 2 wherein the set of nearest neighbors of any point is determined using the corresponding 3D index tree.

4. The computer-implemented process of claim 1 wherein a robust estimator is used to fit each 3D plane to each point and its set of nearest neighbors.

5. The computer-implemented process of claim 1 wherein projecting each input point onto its corresponding 3D plane further comprises projecting each input point along a computed normal of the corresponding plane to lie on the surface of that plane.

6. The computer-implemented process of claim 1 wherein the number of nearest neighbors for any point is an adjustable parameter.

7. The computer-implemented process of claim 1 further comprising reversing a direction of the corresponding surface normal of any output point whenever that direction does not point in the same relative direction as the corresponding surface normals of each point in the set of nearest neighbors.

8. The computer-implemented process of claim 1 further comprising one or more iterations of designating the original set of 3D output points as a new set of 3D input points, and repeating the processes of claim 1 using the new set of 3D input points to create a new set of 3D output points and corresponding surface normals.

9. A system for smoothing 3D point clouds, comprising:
   a general purpose computing device; and
   a computer program comprising program modules executable by the computing device, wherein the computing device is directed by the program modules of the computer program to:
   receive a 3D point cloud comprising a set of 3D input points;
   determine a set of the nearest neighbors of each 3D point;
   fit a plane in 3D space to each 3D point and its set of nearest neighbors;
   create a set of 3D output points by projecting each input point onto its corresponding plane;
   determine sets of nearest neighbors for each output point;
   fit planes to each output point and its set of nearest neighbors;
   compute a surface normal for each output point from the corresponding plane; and
   wherein the set of 3D output points and corresponding surface normals represent a smoothed 3D point cloud.

10. The system of claim 9 further comprising generating a 3D object model from the smoothed 3D point cloud.

11. The system of claim 9 wherein a robust estimator is used to fit each 3D plane to each point and its set of nearest neighbors.

12. The system of claim 9 wherein projecting each input point onto its corresponding 3D plane further comprises projecting each input point along a computed normal of the corresponding plane to lie on the surface of that plane.

13. The system of claim 9 wherein the number of nearest neighbors for any point is an adjustable parameter.

14. The system of claim 9 further comprising reversing a direction of the corresponding surface normal of one or more output points whenever that direction does not point in the same relative direction as the corresponding surface normals of a set of neighboring points.

15. The system of claim 9 further comprising one or more iterations of designating the smoothed 3D point cloud as a new set of 3D input points, and repeating the processes of claim 9 using the new set of 3D input points to create a new smoothed 3D point cloud.

16. A computer-readable storage device having computer executable instructions stored therein for smoothing 3D point-based models, said instructions causing a computing device to execute a method comprising:
   receiving a set of 3D input points representing a 3D input model;
   using the set of 3D input points to determine a set of the nearest j neighbors of each input point;
   for each input point, fitting a corresponding plane in 3D space to the point and its set of nearest j neighbors;
   creating a set of output 3D points by projecting each input point onto its corresponding plane along a surface normal of that plane;
   using the set of 3D output points to determine a set of the nearest k neighbors of each output point;
   for each output point, fitting a corresponding plane in 3D space to the point and its set of nearest k neighbors;
   for each output point, computing a corresponding surface normal from the corresponding plane; and
   wherein the set of 3D output points and corresponding surface normals represent a smoothed 3D output model.

17. The computer-readable storage device of claim 16 further comprising constructing a corresponding 3D index tree from any set of 3D points and wherein the set of nearest neighbors of any point is determined using the corresponding 3D index tree.

18. The computer-readable storage device of claim 16 wherein a robust estimator is used to fit each 3D plane to each point and its set of nearest neighbors.

19. The computer-readable storage device of claim 16 wherein the number of nearest neighbors for any point is an adjustable parameter.

20. The computer-readable storage device of claim 16 further comprising reversing a direction of the corresponding surface normal of any output point whenever that direction does not point in the same relative direction as the corresponding surface normals of each point in the set of nearest neighbors.

* * * * *